(12) United States Patent
Sun

(10) Patent No.: US 8,247,979 B2
(45) Date of Patent: Aug. 21, 2012

(54) LIGHT-GUIDE DEVICE AND MOUNTING ASSEMBLY USING SAME

(75) Inventor: Zheng-Heng Sun, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 196 days.

(21) Appl. No.: 12/842,043

(22) Filed: Jul. 23, 2010

(65) Prior Publication Data

US 2011/0156595 A1    Jun. 30, 2011

(30) Foreign Application Priority Data

Dec. 25, 2009   (CN) .......................... 2009 1 0312244

(51) Int. Cl.
*H05B 37/02* (2006.01)
*G08B 21/00* (2006.01)

(52) U.S. Cl. ...................... 315/152; 315/149; 340/691.1; 340/653

(58) Field of Classification Search .......... 315/149–159; 340/653, 691.1, 815.45

See application file for complete search history.

(56) References Cited

U.S. PATENT DOCUMENTS

| | | | | |
|---|---|---|---|---|
| 4,913,383 | A * | 4/1990 | Hill et al. ...................... | 248/27.1 |
| 6,934,150 | B2 * | 8/2005 | Kitchen et al. ............ | 361/679.33 |
| 2004/0209493 | A1 * | 10/2004 | Garnett et al. ................ | 439/76.1 |
| 2009/0051558 | A1 * | 2/2009 | Dorval ........................... | 340/653 |
| 2010/0231406 | A1 * | 9/2010 | Hayden, Sr. ................ | 340/691.1 |
| 2011/0121820 | A1 * | 5/2011 | Handshoe et al. ............ | 324/126 |
| 2011/0221609 | A1 * | 9/2011 | Aguren et al. ................ | 340/687 |

* cited by examiner

*Primary Examiner* — Don Le
(74) *Attorney, Agent, or Firm* — Altis Law Group, Inc.

(57) ABSTRACT

A light-guide device is provided for detecting and amplify the light emitted by indicator lamps of functional modules mounted in a chassis. The light-guide device includes a plurality of light-guide columns, a circuit board, and a plurality of light-guide blocks. The circuit board includes a plurality of amplifying circuits, each including a photosensitive diode and a plurality of light-emitting diodes (LEDs). One of the LEDs is lit when the photosensitive diode detecting the light emitted by the indicator lamp of one corresponding functional modules. The light-guide blocks guide lights emitted by the corresponding LEDs to an outside of the chassis.

12 Claims, 7 Drawing Sheets

LIGHT-GUIDE DEVICE AND MOUNTING ASSEMBLY USING SAME

BACKGROUND

1. Technical Field

The present disclosure relates to a light-guide device and a mounting assembly using the light-guide device.

2. Description of the Related Art

Electronic apparatus often include a chassis and a plurality of functional modules mounted in the chassis. These functional modules are usually equipped with indicator lamps to show current working status of the corresponding functional modules. If the indicator lamps are disposed inside the chassis, light-guide columns are used to guide the light emitted by the indicator lamps to outside the chassis. However, after being guided over such distances, the intensity of the light is significantly reduced and the light becomes hard to see.

DETAILED DESCRIPTION

Figure 1:
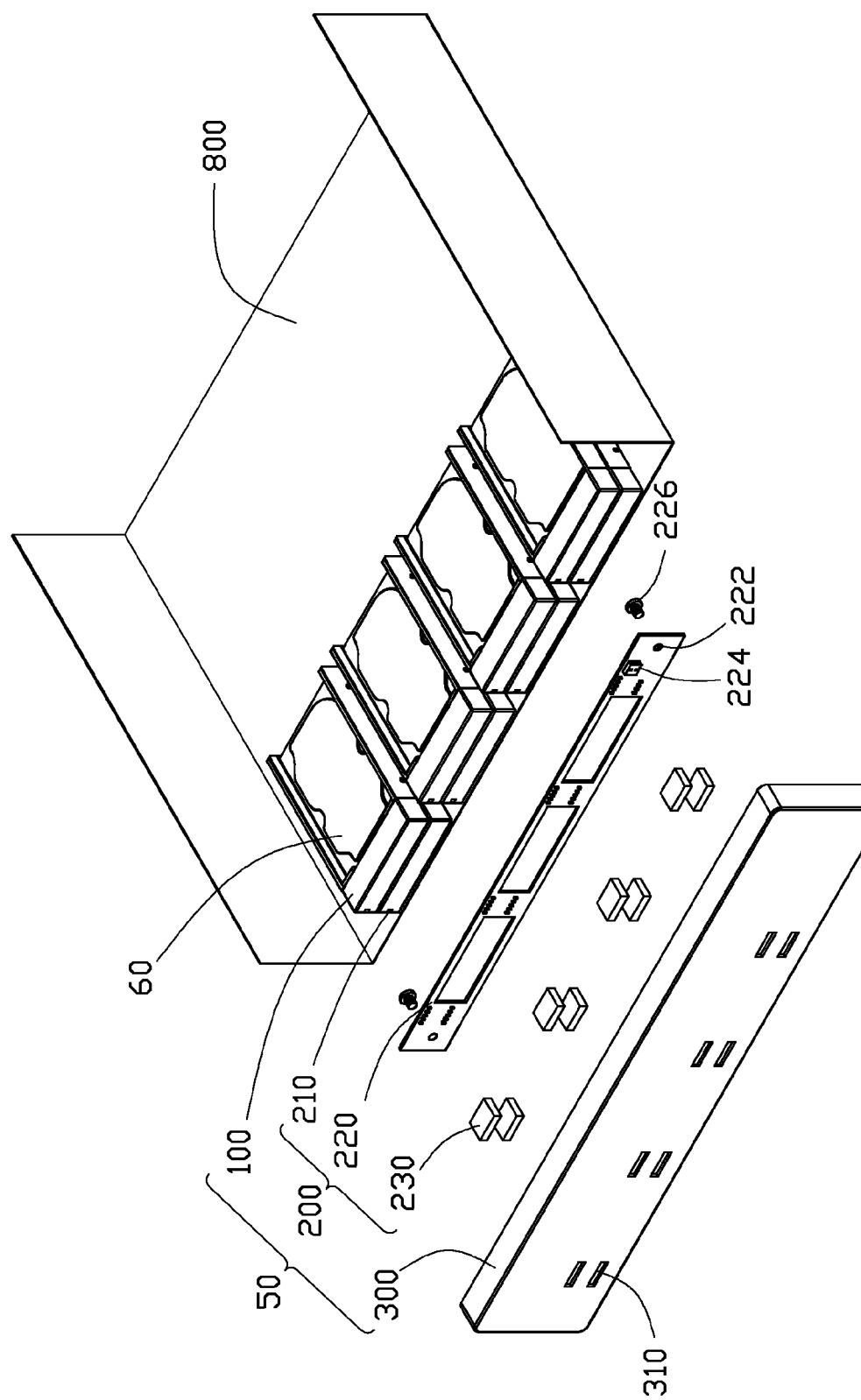
FIG. 1 is an exploded, isometric view of an embodiment of an mounting assembly and a plurality of functional modules, the mounting assembly comprising a chassis, a plurality of mounting brackets, a front bezel, and a light-guide device including a circuit board.
Figure 2:
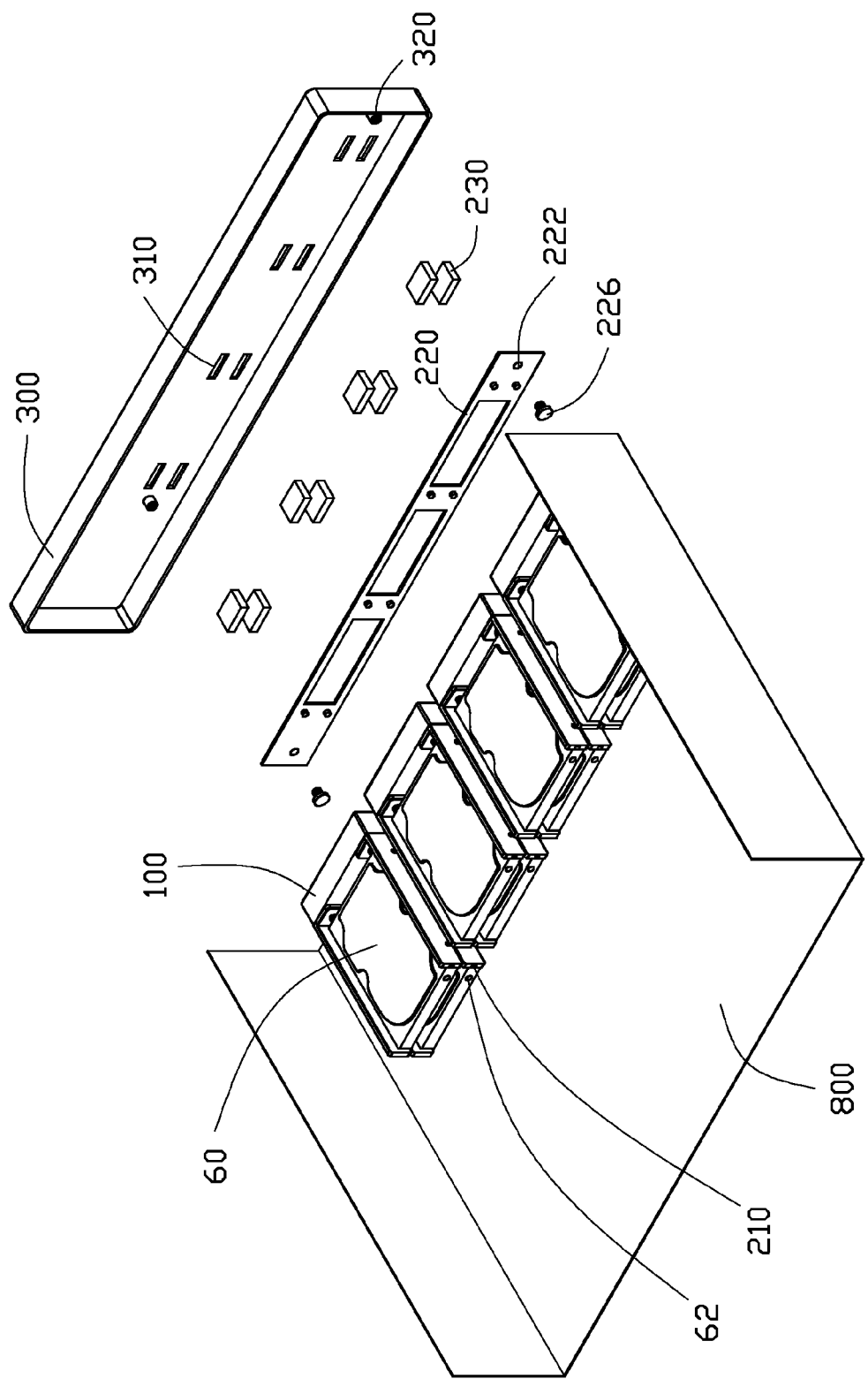
FIG. 2 is similar to FIG. 1, but showing a different perspective.
Figure 3:
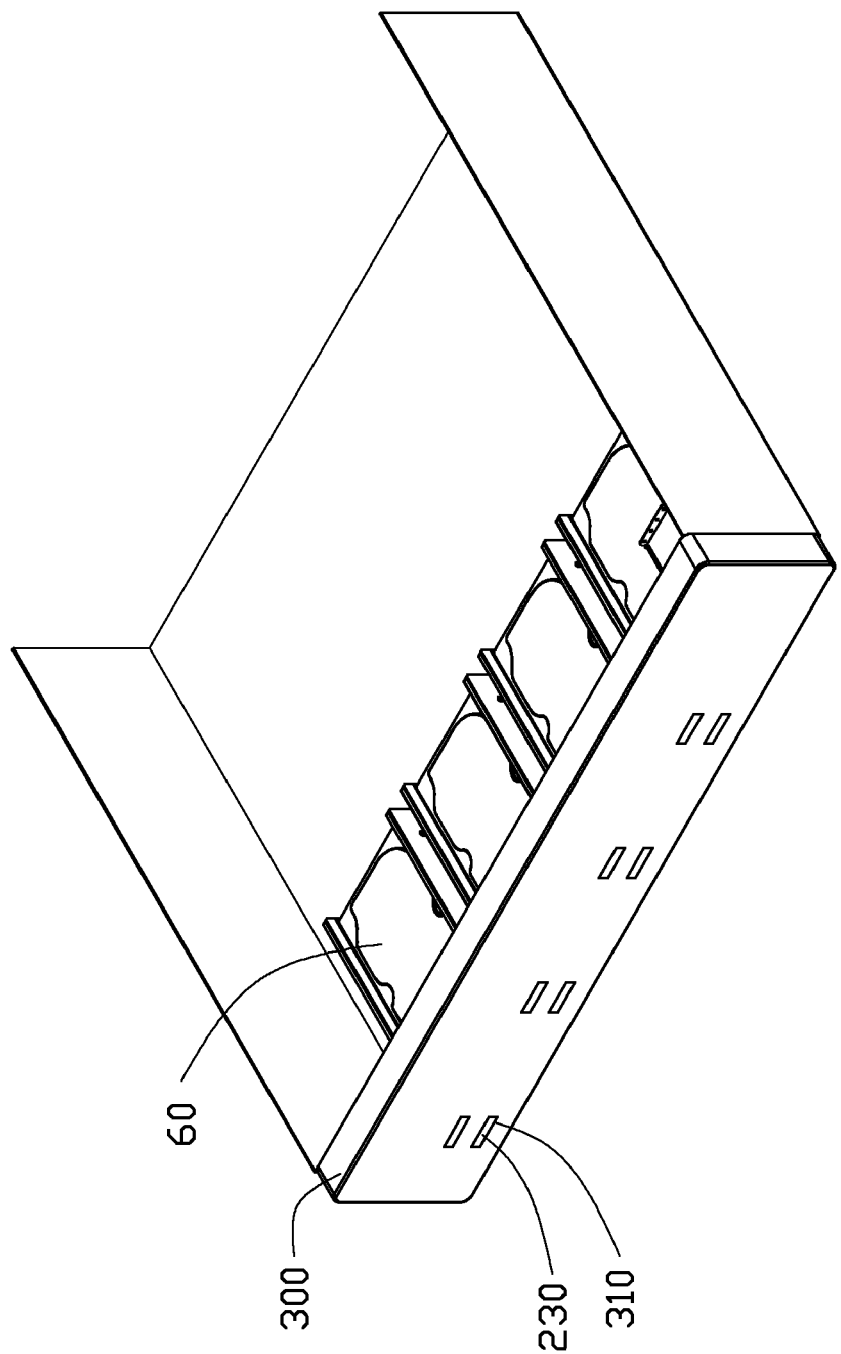
FIG. 3 is an assembled, isometric view of FIG. 1.

Referring to FIGS. 1 to 4, an embodiment of a mounting assembly 50 is provided to mount a plurality of functional modules 60 therein. The mounting assembly 50 includes a chassis 800, a plurality of mounting brackets 100, a light-guide device 200, and a front bezel 300 attached to the chassis 800. Each of the functional modules 60 is equipped with an indicator lamp 62 embedded in a rear end thereof. Two threaded holes 64 are defined in each of opposite sidewalls of each of the functional modules 60.

Figure 4:
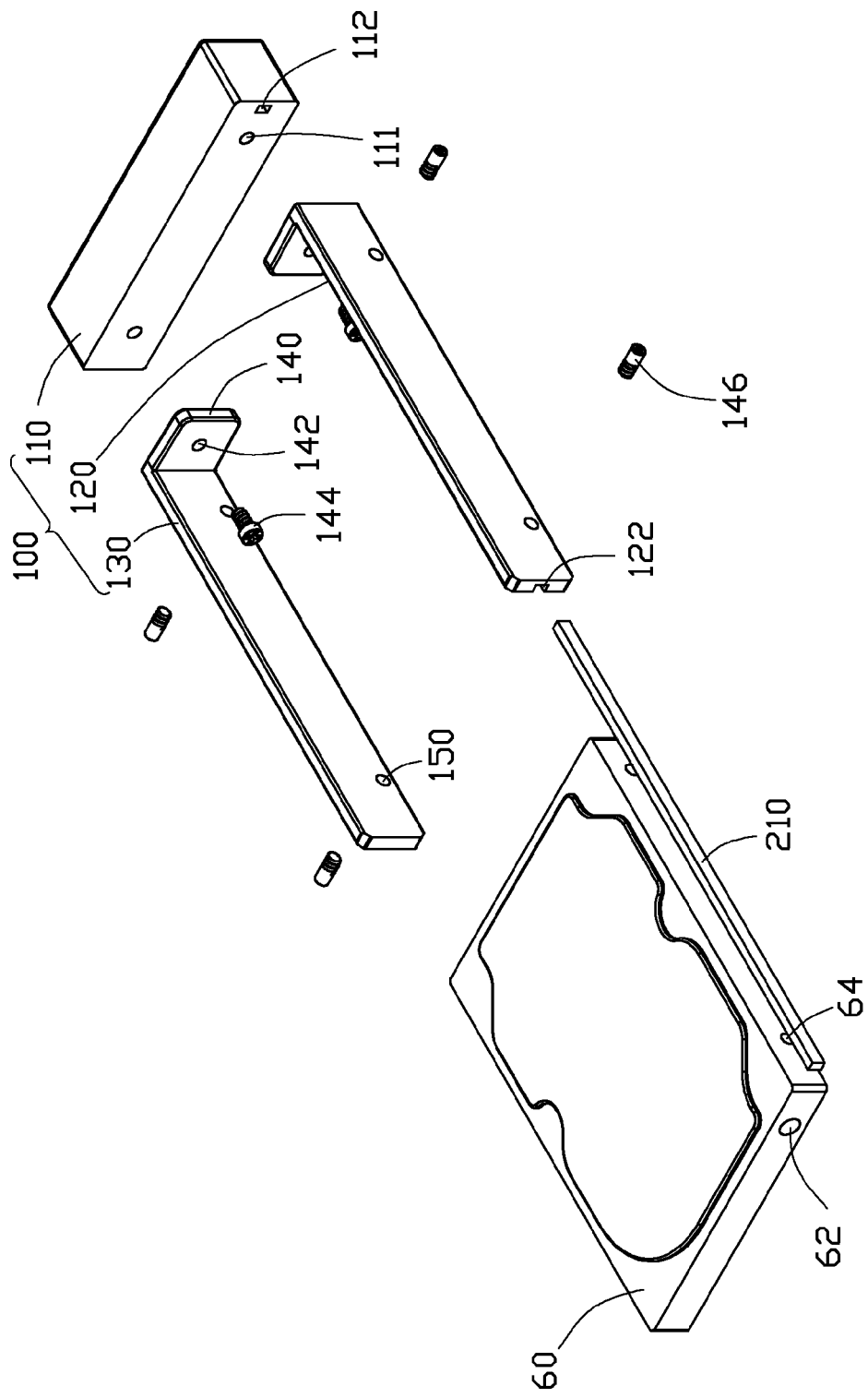
FIG. 4 is an exploded, isometric view of one of the mounting brackets and one of the functional module of FIG. 1.

Referring to FIG. 4, the mounting bracket 100 includes an end retainer 110, a first side plate 120, and a second side plate 130. The end retainer 110 defines two threaded holes 111, and a through hole 112. A connecting tab 140 perpendicularly extends from each of the first side plate 120 and the second side plate 130. The connecting tab 140 defines a mounting hole 142. The first side plate 120 and the second side plate 130 each define two mounting holes 150 corresponding to the threaded holes 64 of the functional module 60. A groove 122 is longitudinally defined through an inner side of the first side plate 120, corresponding to the through hole 112 of the end retainer 110.

The front bezel 300 defines a plurality of mounting holes 310. Two inner threaded post 320 extend from an inner side of the front bezel 300. The front bezel 300 forms a plurality of locking portion (not shown) to retain the front bezel 300 to the chassis 800.

The light-guide device 200 includes a light-guide column 210 to be engaged in the groove 122 of the first side plate 120 of each mounting bracket 100, a circuit board 220, and a light-guide block 230 to be engaged in each mounting hole 310 of the front bezel 300.

Figure 5:
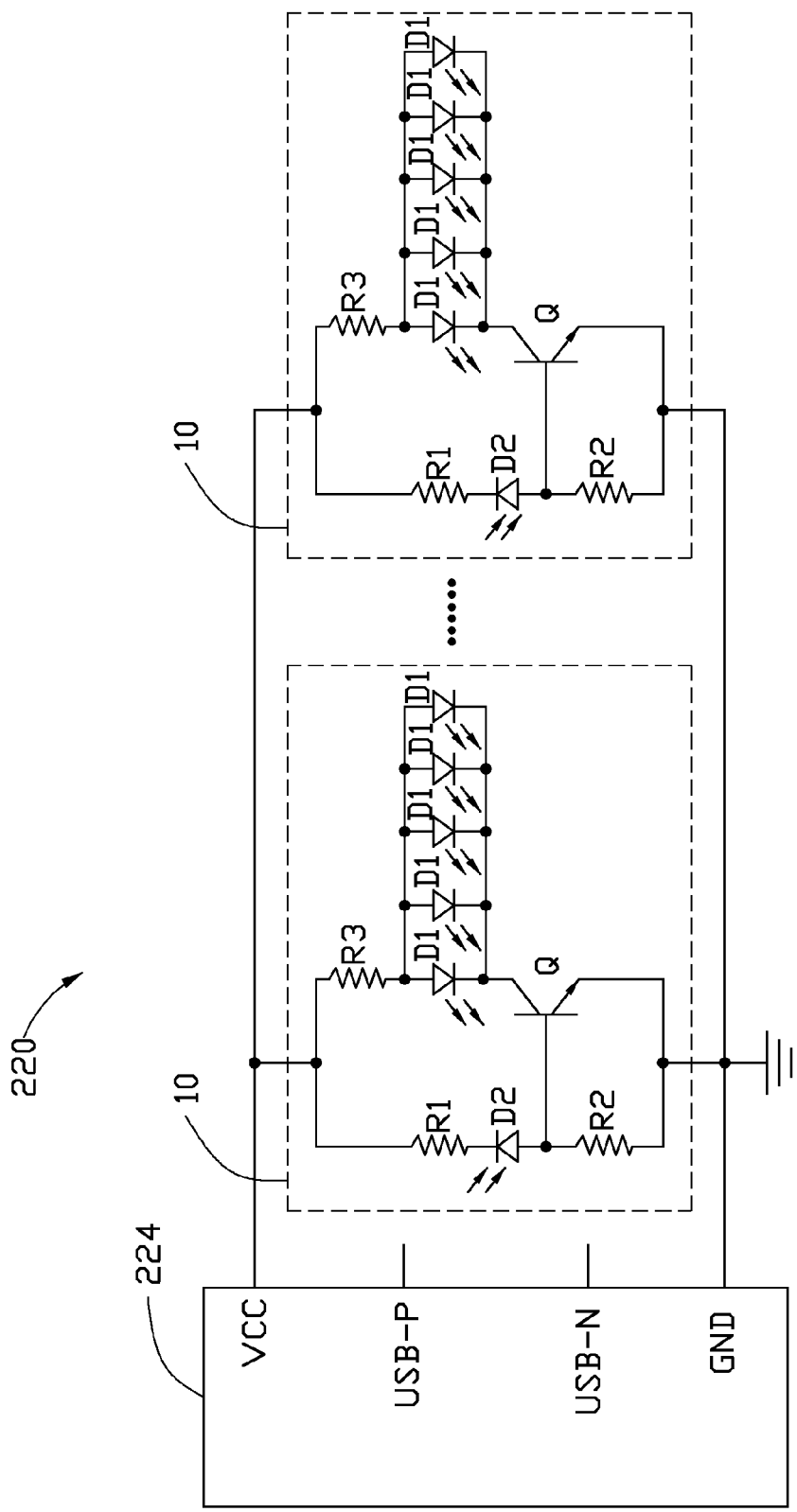
FIG. 5 is a circuit diagram of the circuit board of FIG. 1.
Figure 6:
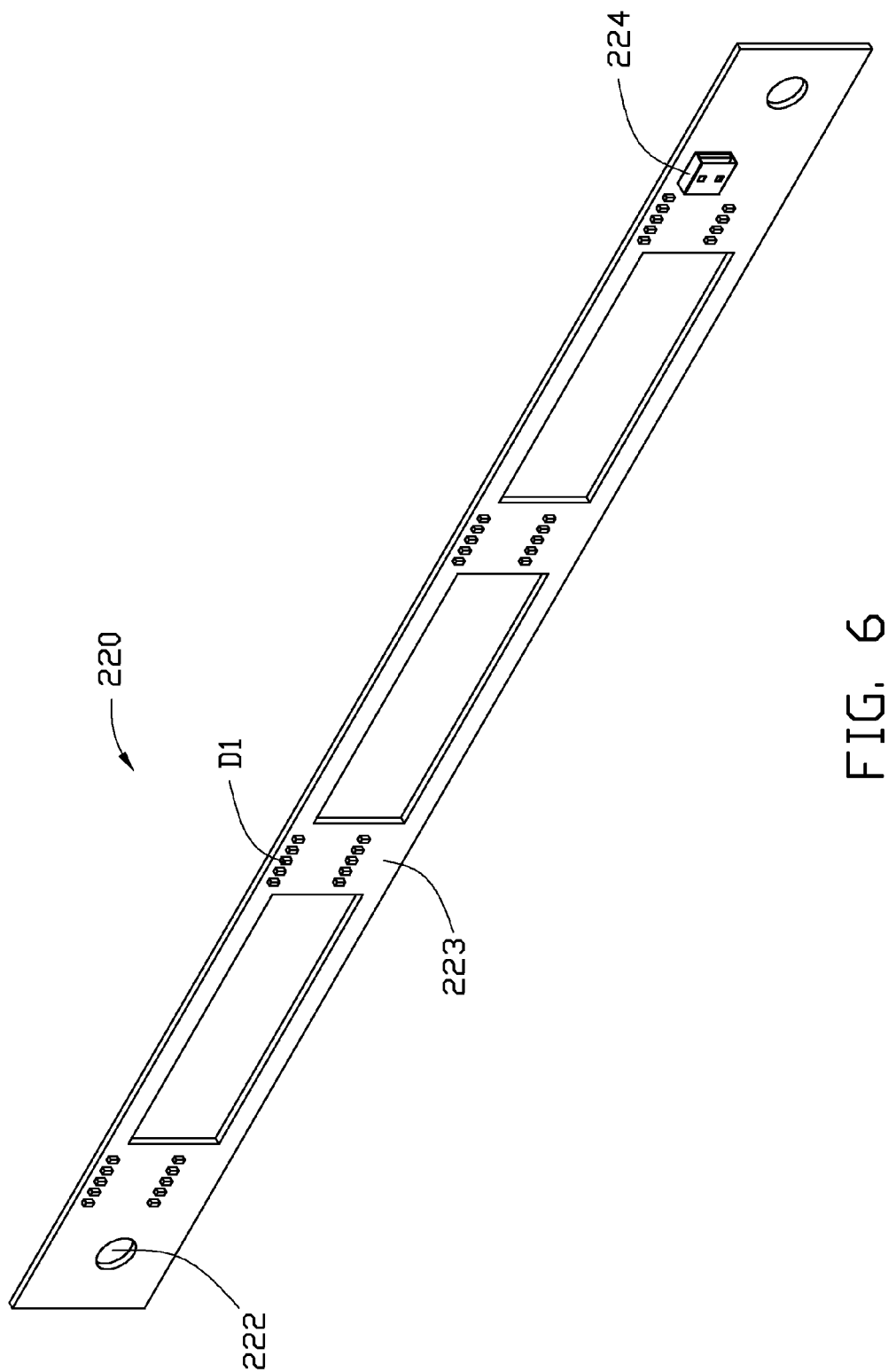
FIG. 6 is an enlarged view of the circuit board of FIG. 1.

Referring to FIGS. 5 and 6, the circuit board 220 defines two mounting holes 222 correspondingly adjacent to two opposite ends of the circuit board 220, and includes a plurality of amplifying circuits 10 each corresponding to one functional module 60. A connector 224 is positioned on a first side 223 of the circuit board 220. In one embodiment, the connector 224 is a universal serial bus connector, which includes a power terminal VCC, a ground terminal GND, and two signal terminals USB-P, USB-N. The signal terminals USB-P and USB-N are two idle pins, and the ground terminal GND is grounded. The connector 224 is electrically coupled to a motherboard (not shown) in the chassis 800 to transfer power for the amplifying circuit 10.

Figure 7:
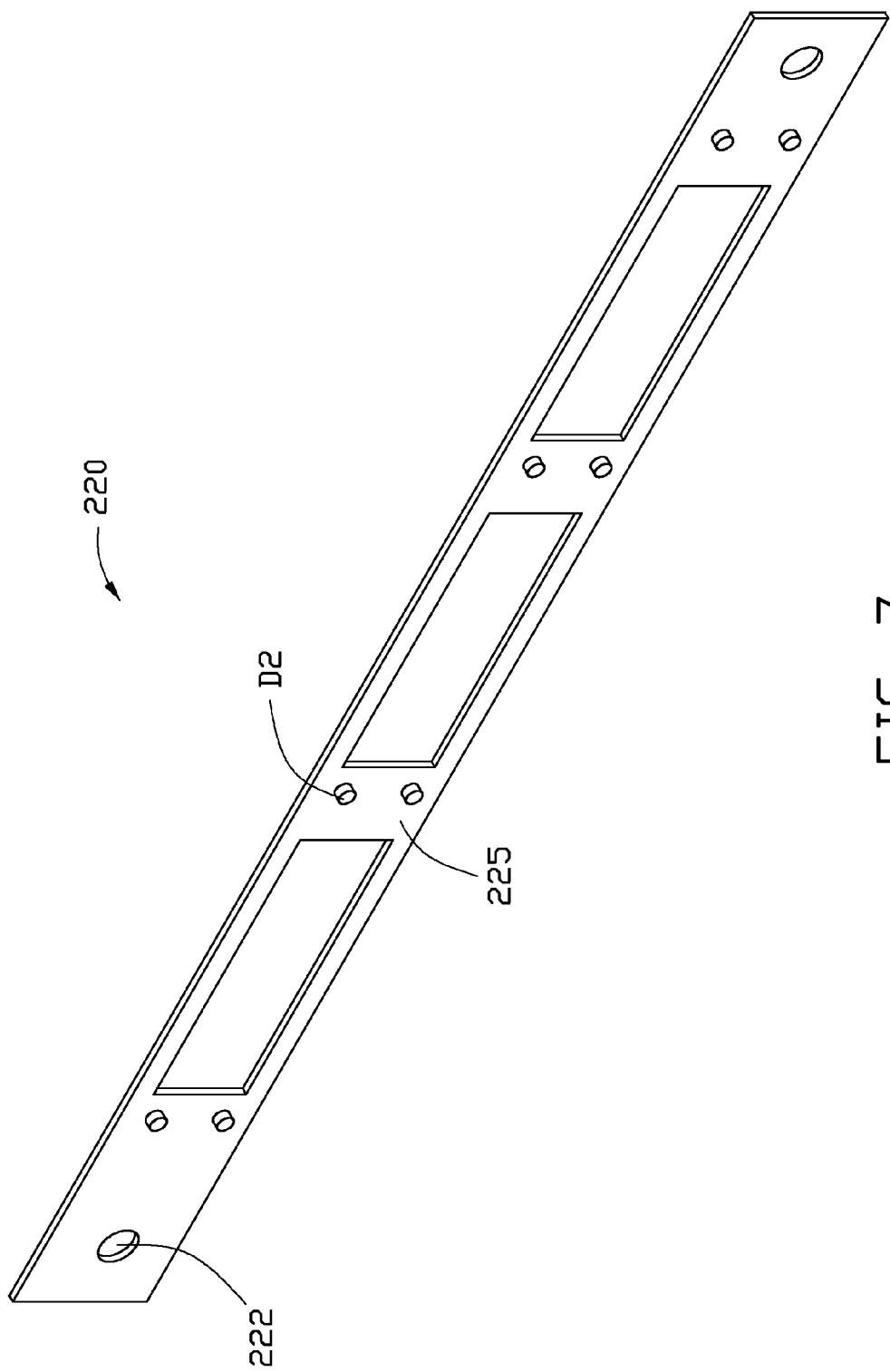
FIG. 7 is an enlarged view of the circuit board of FIG. 2.

Referring to FIGS. 5-7, each amplifying circuit 10 includes a plurality of light-emitting diodes (LEDs) D1 disposed on the first side 223 of the circuit board 220, a photosensitive diode D2 disposed on a second side 225 of the circuit board 220 opposite to the first side 223, an electronic switch, and resistors R1-R3. In one embodiment, the quantity of the LEDs D1 of each amplifying circuit 10 is five, and the electronic switch is a transistor Q. In other embodiments, the quantity may vary. The cathode of the photosensitive diode D2 is connected to the power terminal VCC of the connector 224 via the resistor R1. The anode of the photosensitive diode D2 is grounded via the resistor R2. The LEDs D1 of each amplifying circuit 10 are connected in parallel. The anodes of the LEDs D1 are connected to the power terminal VCC via the resistor R3, and the cathodes of the LEDs D1 are connected to the collector of the transistor G. The base of the transistor G is connected to the anode of the photosensitive diode D2. The emitter of the transistor G is grounded.

Referring to FIG. 4, in assembling one of the functional modules 60 to the corresponding mounting bracket 100, the first side plate 120 and the second side plate 130 of the mounting bracket 100 are connected to the end retainer 110 of the mounting bracket 100, correspondingly adjacent to two opposite ends of the end retainer 110, with two fasteners 144 such as screws, correspondingly passing through the mounting holes 142 of the first and second side plates 120, 130, and engaging into the threaded holes 111 of the end retainer 110. The groove 122 of the first side plate 120 is aligned with the through hole 112 of the end retainer 110. The light-guide column 210 is received in the groove 122 of the first side plate 120 of the mounting bracket 100, and a first end of the light-guide column 210 extends through the through hole 112 of the end retainer 110. The functional module 60 is received in an accommodating space bounded by the first and second side plates 120, 130, and the end retainer 110, with the indicator lamp 62 opposite to the end retainer 110. Four fasteners 146, such as screws, correspondingly extend through the through holes 122 of the first and second side plates 120, 130, and engage in the threaded holes 64 of the functional module 60, to mount the functional module 60 in the mounting bracket 100. At the same time, the light-guide column 210 is retained in the groove 122 of the first side plate 120, with a second end of the light-guide column 210 adjacent to the indicator lamp 62 of the functional module 60. Other mounting brackets 100 and functional modules 60 are assembled in the same way as described above. The assemblies of the mounting brackets 100 and the corresponding functional modules 60 are installed in the chassis 800 adjacent to a front end of the chassis 800. Two screws 226 extend through the mounting holes 222 of the circuit board 220 and engage in the corresponding posts 320 of the front bezel 300 to retain the circuit board 220 to the rear side of the front bezel 300, with the first side 223 of the circuit board 220 facing the front bezel 300. The light-guide blocks 230 are engaged in corresponding mounting holes 310 of the front bezel 300, and abutting corresponding LEDs D1 of the circuit board 220. The front bezel 300 is attached to the front end of the chassis 800, with the second photosensitive diodes D2 abutting the first ends of the light-guide columns 210.

During operation, if the indicator lamp 62 of one of the functional module 60 is not lit, no light is detected by the corresponding photosensitive diode D2. Therefore, the photosensitive diode D2 is not conductive, and the base of the transistors Q is at a low voltage level. The transistor Q is turned off, and the LEDs D1 are not lit. If the indicator lamp 62 of one of the functional modules 60 is lit, the light of the indicator lamp 62 is guided by the light-guide column and is detected by the photosensitive diode D2. The photosensitive diode D2 is conductive, and the base of the transistor Q is at a high voltage level. The transistor Q is turned on, therefore the LEDs D1 are lit. The light of the LEDs D1 are guided by the corresponding light-guide block 230 to the front side of the front bezel 300 to be easily read.

It is believed that the present embodiments and their advantages will be understood from the foregoing description, and it will be apparent that various changes may be made thereto without departing from the spirit and scope of the description or sacrificing all of its material advantages, the examples hereinbefore described merely being exemplary embodiments.

What is claimed is:

1. A light-guide device to detect and amplify light emitted by an indicator lamp of a functional module mounted in a chassis, the light-guide device comprising:
a circuit board comprising an amplifying circuit, the amplifying circuit comprising a photosensitive diode to detect the light emitted by the indicator lamp, a plurality of light-emitting diodes (LEDs), and an electronic switch, wherein the LEDs and the electronic switch are connected between a power source and ground, the photosensitive diode is connected to the electronic switch to turn on the electronic switch, thereby lighting the LEDs, in response to the photosensitive diode detecting a light emitted by the indicator lamp.

2. The light-guide device of claim 1, further comprising a light-guide column comprising a first end abutting the indicator lamp of the functional module and a second end abutting the photosensitive diode, wherein the light-guide column guides light emitted by the indicator lamp to the photosensitive diode.

3. The light-guide device of claim 1, further comprising a light-guide block comprising a first end abutting the LEDs, and a second end viewable from an outside of the chassis.

4. The light-guide device of claim 1, wherein the circuit board further comprises a connector, the LEDs are connected to the power source via the connector.

5. The light-guide device of claim 4, wherein the electronic switch is a transistor comprising a base, a collector, and an emitter, the connector comprises a power terminal connected to the power source and a ground terminal grounded, a cathode of the photosensitive diode is electrically connected to the power terminal of the connector via a first resistor, an anode of the photosensitive diode is connected to the base of the transistor and grounded via a second resistor, the LEDs are connected in parallel, cathodes of the LEDs are connected to the collector of the transistor, anodes of the LEDs are connected to the power terminal of the connector via a third resistor, the emitter of the transistor is grounded.

6. A mounting assembly for a functional module equipped with an indicator lamp, the mounting assembly comprising:
a mounting bracket receiving the functional module;
a chassis accommodating the mounting bracket;
a front bezel attached to a front end of the chassis;
a circuit board disposed between the chassis and the front bezel, and comprising an amplifying circuit to detect and amplify the light emitted by an indicator lamp of the functional module.

7. The mounting assembly of claim 6, wherein the amplifying circuit a photosensitive diode to detect the light emitted by the indicator lamp and a plurality of light-emitting diodes (LEDs) electrically connected to the photosensitive diode, wherein the LEDs are lit in response to the photosensitive diode detecting a light emitted by the indicator lamp.

8. The mounting assembly of claim 7, further comprising a light-guide column mounted to the mounting bracket, the light-guide column comprising a first end abutting the indicator lamp of the functional module and a second end abutting the photosensitive diode, wherein the light-guide column guides light emitted by the indicator lamp to the photosensitive diode.

9. The mounting assembly of claim 8, wherein the mounting bracket comprises an end retainer, and a first side plate, and a second side plate fixed to the end plate to cooperatively bounding a receiving space for the functional module, the first side plate defines a groove in a side facing the second side plate, the end retainer defines a through hole aligned with the groove, the light-guide column is engaged in the groove and extends through the through hole of the end retainer.

10. The mounting assembly of claim 7, further comprising a light-guide block attached to the front bezel, and comprising a first end abutting the LEDs, and a second end viewable from an outer side of the front bezel.

11. The mounting assembly of claim 7, wherein the circuit board is mounted to a side of the front bezel facing the chassis, the photosensitive diode is disposed on a side of the circuit board facing the functional module, and the LEDs is disposed on another side of the circuit board facing the front bezel.

12. The mounting assembly of claim 6, wherein the circuit board further comprises a connector connected to a power source to supply an electrical power for the amplifying circuit, the amplifying circuit further comprises a transistor having a base, a collector, and an emitter, the connector comprises a power terminal and a ground terminal, a cathode of the photosensitive diode is electrically connected to the power terminal of the connector via a first resistor, an anode of the photosensitive diode is connected to the base of the transistor and grounded via a second resistor, the LEDs are connected in parallel between the connector and the transistor, cathodes of the LEDs are connected to the collector of the transistor, anodes of the LEDs are connected to the power terminal of the connector via a third resistor, the emitter of the transistor is grounded.

* * * * *